(12) United States Patent
Easton et al.

(10) Patent No.: US 6,766,706 B2
(45) Date of Patent: Jul. 27, 2004

(54) CONTROL LEVER ASSEMBLY

(75) Inventors: David Joseph Easton, Cedar Falls, IA (US); Bruce Craig Newendorp, Cedar Falls, IA (US); Micah Yates Steele, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/287,721

(22) Filed: Nov. 1, 2002

(65) Prior Publication Data
US 2004/0083838 A1 May 6, 2004

(51) Int. Cl.$^7$ .......................... F16H 59/00; B60K 20/00; G05G 5/08
(52) U.S. Cl. ...................................... 74/335; 74/473.25
(58) Field of Search ............................. 74/335, 473.13, 74/473.21, 473.25, 473.3, 473.26, 523; 192/219.4

(56) References Cited
U.S. PATENT DOCUMENTS

| | | | | |
|---|---|---|---|---|
| 4,721,004 A | * | 1/1988 | Ward ........................ | 74/473.21 |
| 4,732,232 A | * | 3/1988 | Miyagi et al. ............... | 180/336 |
| 5,406,860 A | * | 4/1995 | Easton et al. .................. | 74/335 |
| 5,862,708 A | * | 1/1999 | Shamoto .................. | 74/473.18 |
| 6,000,296 A | * | 12/1999 | Sundquist ................ | 74/473.12 |
| 6,192,770 B1 | * | 2/2001 | Miyoshi et al. .......... | 74/473.18 |
| 6,247,378 B1 | * | 6/2001 | Newendorp et al. ..... | 74/473.12 |

OTHER PUBLICATIONS

John Deere; AutoPowr Transmission Stories; "Installation Instructions" Copyright 2001; pp. 1–18.*

* cited by examiner

*Primary Examiner*—Tisha D Lewis

(57) ABSTRACT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

20 Claims, 5 Drawing Sheets

CONTROL LEVER ASSEMBLY

BACKGROUND OF THE INVENTION

The present invention relates to a control lever assembly, and more particularly, to a control lever assembly for use in a vehicle transmission control system.

An electronically controlled transmission, such as a powershift transmission or an infinitely variable transmission (IVT), requires an operator control device, such as a shift control lever, for generating control signals which are supplied to an electronic control unit which, in turn, controls the transmission. For example, U.S. Pat. No. 6,247,378, issued 19 Jun. 2001 to Newendorp et al., describes an operator control for an IVT. Such shift control levers are subject to being inadvertently bumped or knocked out of their park or neutral positions. Such shift control levers have typically employed space-consuming complex and circuitous travel paths in order to avoid the lever being inadvertently moved into a position which commands vehicle movement. It is desired to have a simple shift control lever assembly which prevents inadvertently lever movement.

SUMMARY

Accordingly, an object of this invention is to provide a compact control lever assembly which resists inadvertent lever movement.

These and other objects are achieved by the present invention, wherein a control lever assembly for a vehicle transmission includes a housing which supports a guide plate having a slot and a recess formed in a central portion of the slot. A carrier member is pivotally coupled to the housing about a pivot pin. A lever has a shaft which is supported by the carrier and which is rotatable and axially movable relative to the carrier. The lever has a knob which is mounted on an end of the shaft and which is received by the slot. A spring is coupled between the shaft and the carrier and is biased to rotate the knob and to urge the lever towards the pivot pin. When the knob is in the slot and outside of the recess, the slot walls prevent rotation of the knob and maintain the lever in a first rotary orientation. When the knob is moved into the recess, the spring is automatically able to rotate the knob and lever into a second rotary orientation. When the knob is in the second orientation, the recess walls are engagable with the knob to prevent the lever from being pivoted about the pivot pin. The housing includes a detent member which engages detent rollers mounted on the carrier to releasably hold the lever in selected positions in the slot. The knob may be manually moved axially over an abutment formed by a wall of the recess and rotated into a third rotary orientation.

DETAILED DESCRIPTION

Figure 1:
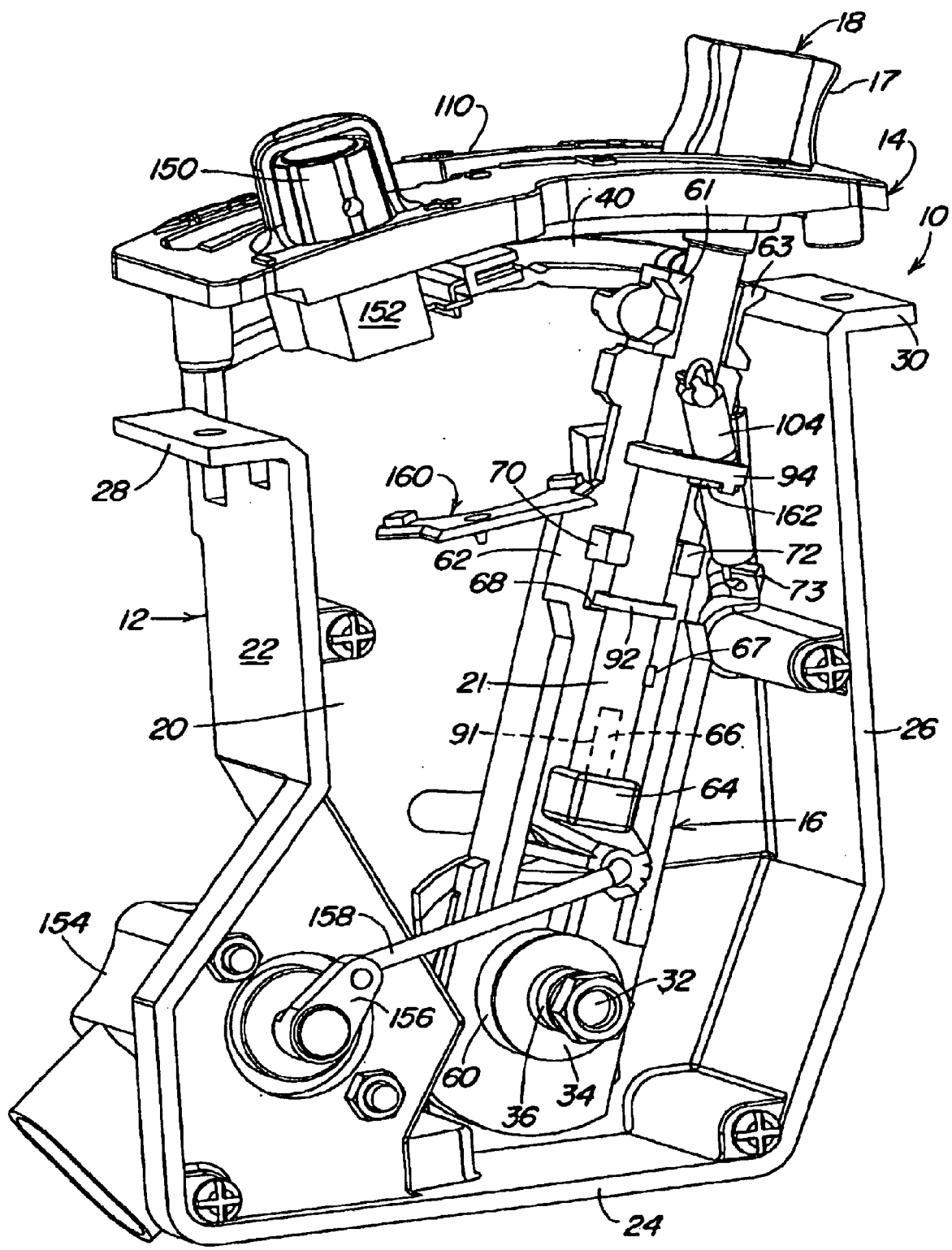
FIG. 1 is a perspective view of a control lever assembly according to the present invention.
Figure 8:
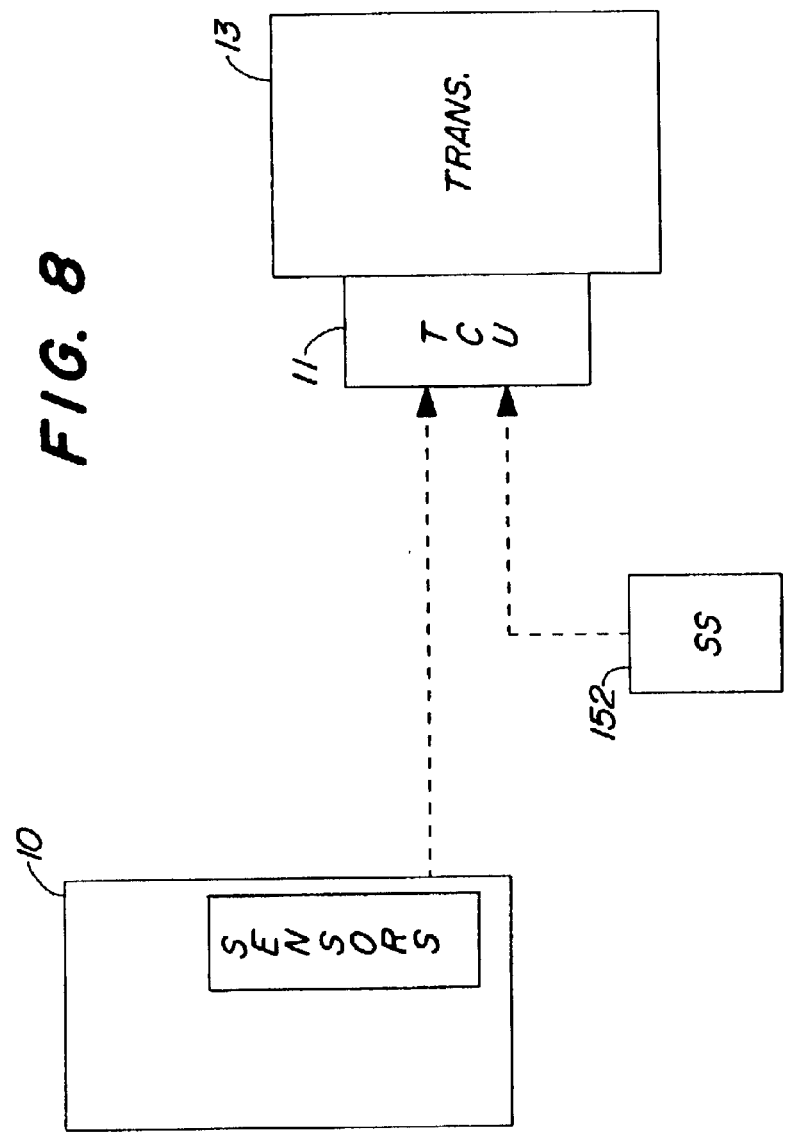
FIG. 8 is a simplified schematic view of a transmission control system including the present invention.

Referring to FIG. 1, a control lever assembly 10 includes a housing 12, a guide plate 14, a lever carrier 16 and a lever 18. The housing 12 includes a plate 20 and side walls 22, 24 and 26. Walls 22 and 26 form a pair of flanges 28 and 30 to which is attached the guide plate 14. Plate 20 supports a pivot pin 32 near wall 24. Pivot pin 32 rotatably supports lever carrier 16 and a friction disk 34 which is biased into engagement with carrier 16 by a coil spring 36 which is also mounted on pin 32. Lever 18 includes a knob 17 mounted on the end of a cylindrical shaft 21. A cover plate (not shown) may be mounted on the edges of walls 22, 24 and 26 in order to protect interior components. As seen in FIG. 8, the control lever assembly 10 is intended for use with an electronic transmission control unit 11 and an electronically controlled transmission 13, such as a commercially available IVT, or some other commercially available electronically controlled transmission.

Figure 2:
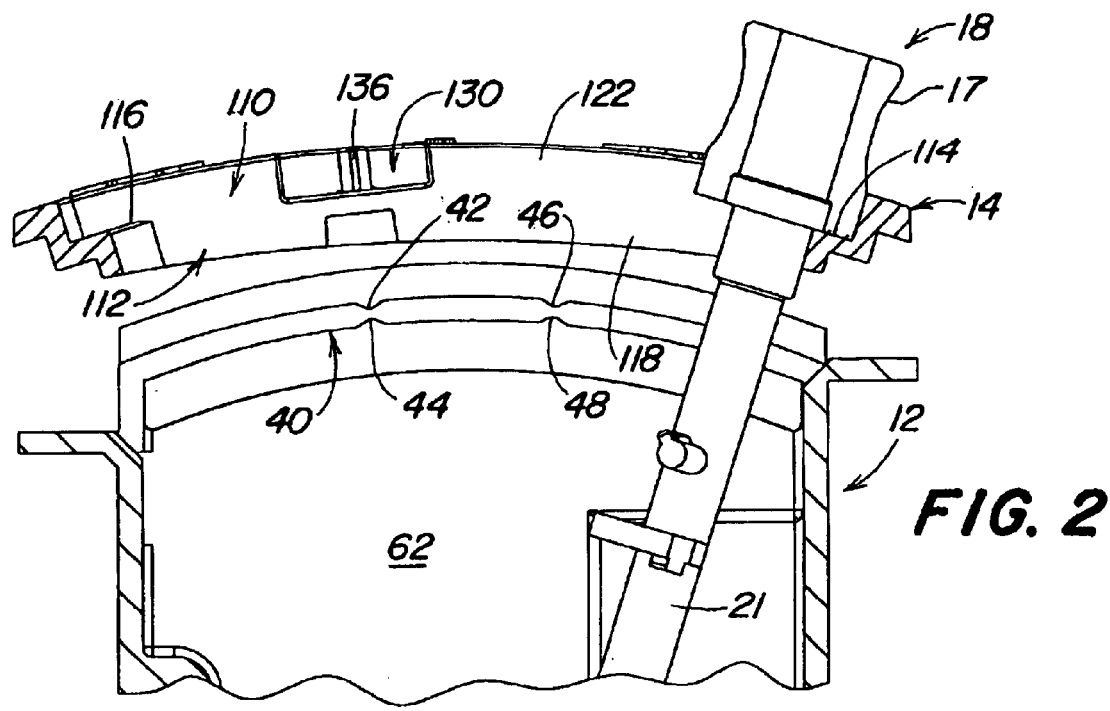
FIG. 2 is a sectional view showing the lever, the guide plate and a portion of the housing of the assembly of FIG. 1.

As best seen in FIG. 2, a curved detent plate 40 projects from plate 20 and is spaced apart from and located underneath guide plate 14. Plate 40 has a center of curvature at the axis of pivot pin 32. First and second pairs of detent grooves 42, 44, 46 and 48 are formed in the detent plate. Detent grooves 42 and 46 are formed in an upper surface of detent plate 40, while detent grooves 44 and 48 are formed in a lower surface of detent plate 40, each lower detent groove being adjacent to and opposite from a corresponding upper detent groove.

Figure 3:
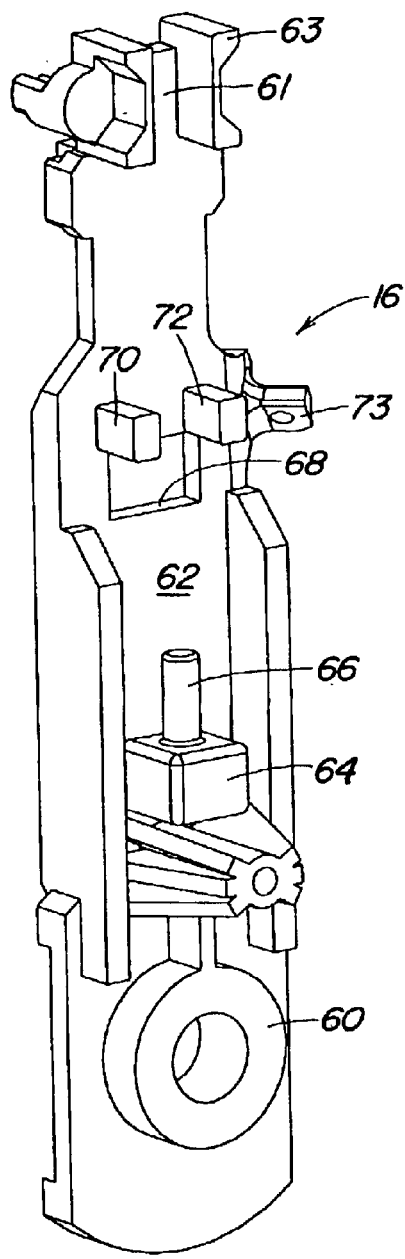
FIG. 3 is a front perspective view of the lever carrier of FIG. 1.
Figure 4:
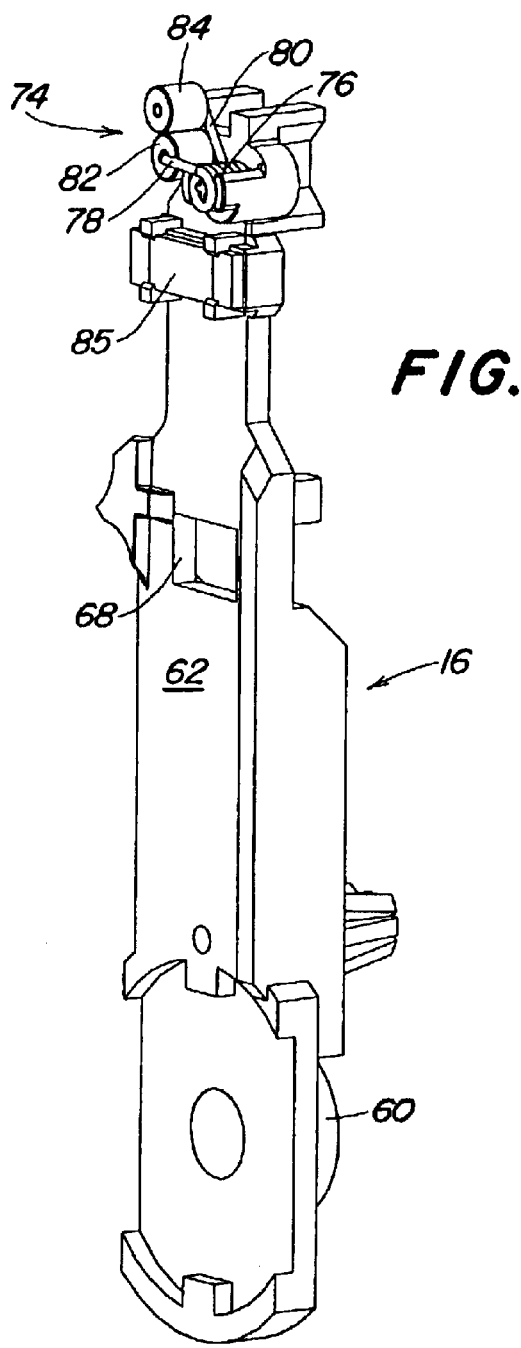
FIG. 4 is a back perspective view of the lever carrier of FIG. 1.

Referring now to FIGS. 1, 3 and 4, the carrier 16 has a hub 60 which is rotatably mounted on pin 32 and which engages friction disk 34. Coil spring 36 is mounted on pin 32 and is biased to urge disk 34 into engagement with an axial end of the hub 60. A carrier plate 62 extends radially from hub 60. A support member 64 projects from plate 62 and is spaced apart and radially outwardly from hub 60. A pair of alignment tabs 61 and 63 project from an end of plate 62 opposite hub 60. Support member 64 supports a guide pin 66 which extends away from pivot pin 32 and which is slidably received in a bore 91 in the radially inner end of lever shaft 19. A pair of tabs 70 and 72 project from plate 62, are spaced apart on either side of lever shaft 19 and positioned radially outwardly from member 64. An opening 68 is formed in plate 62 radially inwardly of tabs 70, 72. Tabs 70, 72 rotatably and slidably engage and support lever shaft 21. A spring anchor tab 73 projects from an edge of plate 62.

Figure 7:
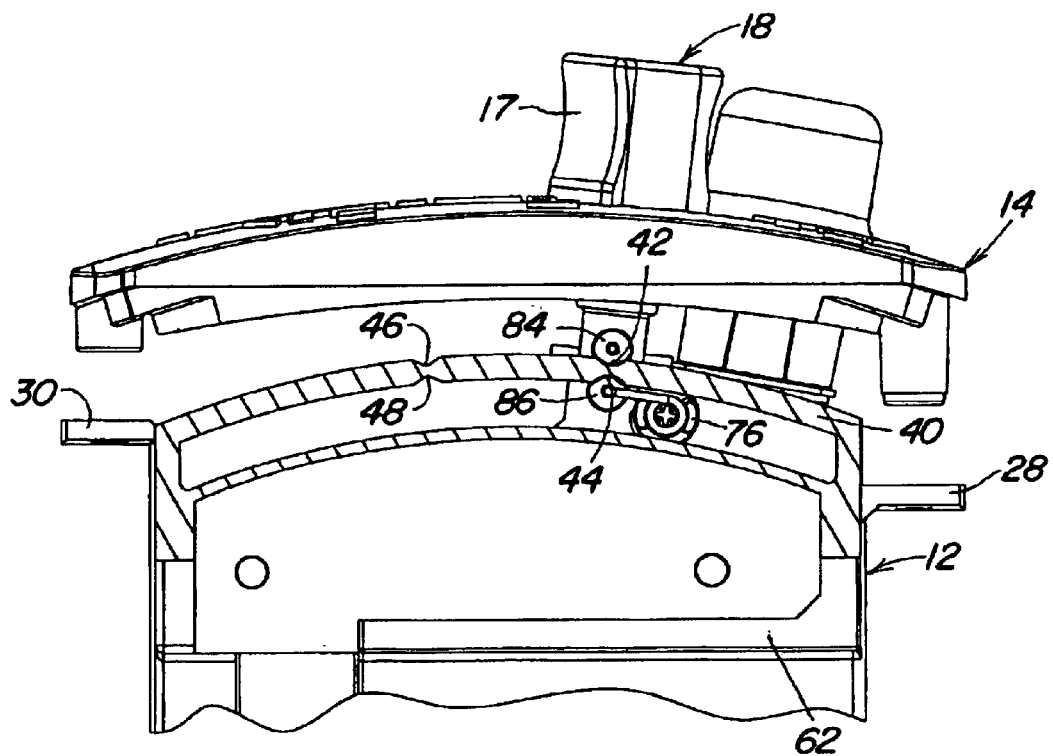
FIG. 7 is a sectional view in a direction opposite to that of FIG. 2 and showing the lever, the guide plate and a portion of the housing of the assembly of FIG. 1.

Referring to FIGS. 4 and 7, a detent assembly 74 is mounted near a radially outer end of the plate 62 and on the side of plate 62 which faces towards housing plate 20. Detent assembly 74 includes a coil spring 76 with a pair of arms 78 and 80. Each arm rotatably supports a corresponding detent roller 82 and 84. Spring 76 is biased to urge rollers 82 and 84 towards each other and into engagement with opposite sides of detent plate 40 (as best seen in FIG. 7). Plate 62 also carries a permanent magnet 85 which interacts with Hall effect switches (not shown), which are mounted on the back of housing plate 20, in order to generate signals representing various discrete positions of lever 18 within guide plate 14.

Figure 5:
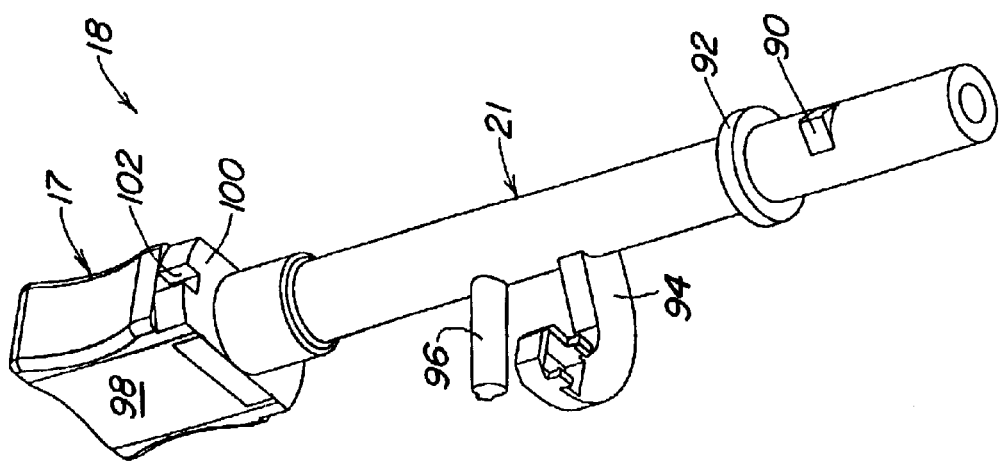
FIG. 5 is a perspective view of the control lever of FIG. 1.

Referring now to FIGS. 1 and 5, a triangular tab 90 projects from the lever shaft 21. Tab 90 is engagable with carrier plate 62 to limit rotation of lever 18 with respect to carrier 16. A blind bore 91 extends into the radially inner end of lever shaft 21 and slidably receives pin 66. An annular collar 92 projects from shaft 21, is spaced axially apart from tab 90 and is received by opening 68. Collar 92 is engagable with tabs 70 and 72 to limit the movement of lever 18 axially away from pivot pin 32. A curved support arm 94 projects from shaft 21 for holding a magnet 95. A spring anchor arm 96 also projects from shaft 21. The knob 17 includes an ergonomically shaped upper part 98 and a lower part 100. A notch 102 is formed in an end of lower part 100. A spring 104 is coupled between arm 96 of lever 18 and anchor 73 of carrier 16. Spring 104 is biased to urge lever 18 radially inwardly towards pivot pin 32 and to rotate lever 18 counter-clockwise, viewing FIG. 1.

Figure 6:
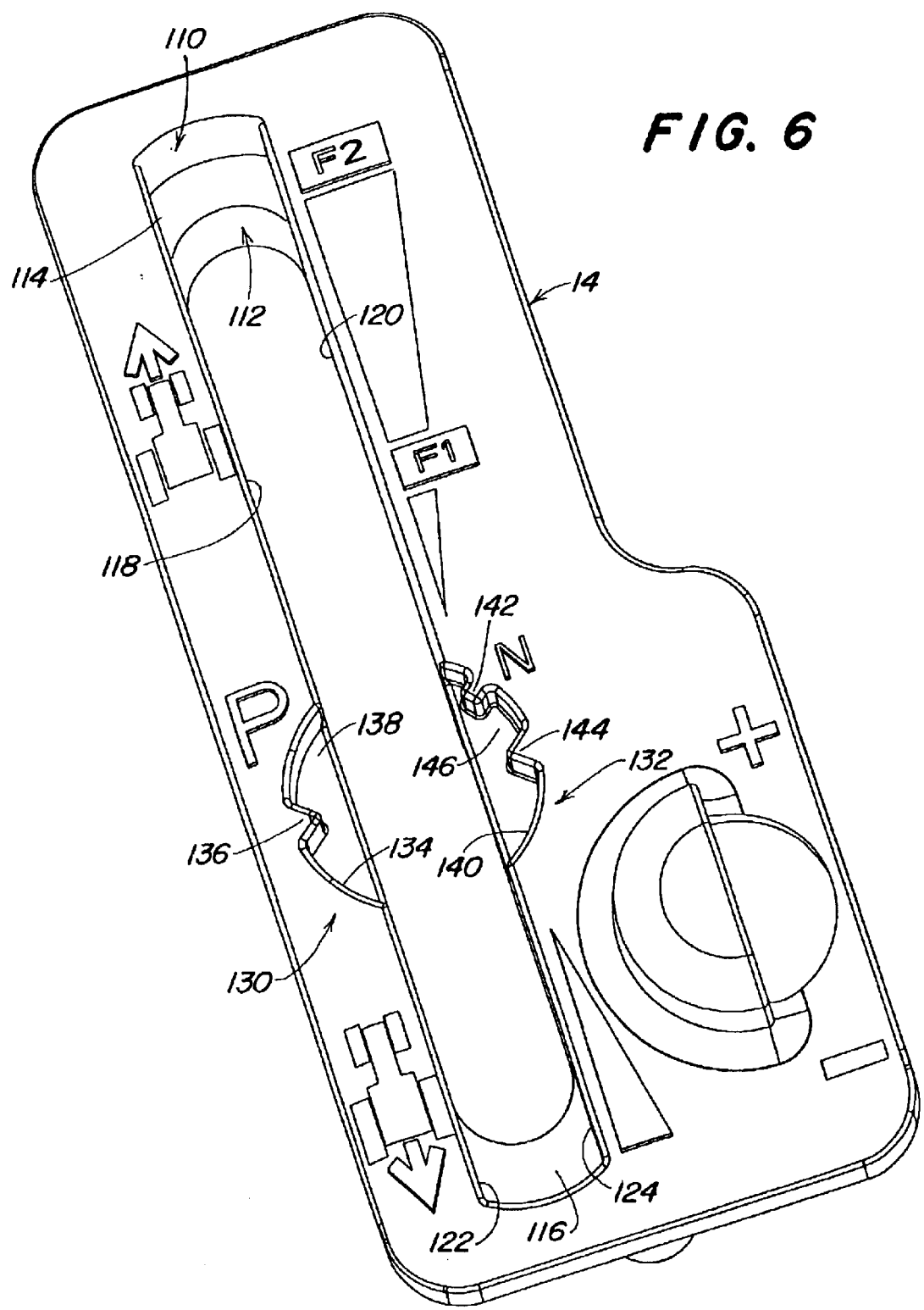
FIG. 6 is a top perspective view of a guide plate of the assembly of FIG. 1.

Referring now to FIGS. 1, 2 and 6, the guide plate 14 is generally rectangular and includes a longer longitudinally extending upper lever slot 110 and a shorter lever slot 112. The ends of slots 110 and 112 are joined by ledges 114 and 116. The ends of upper slot 110 are shaped to accommodate the ends of the lower part 100 of knob 17. The ends of lower slot 112 are curved to accommodate the cylindrical shape of lever shaft 21 just below knob 17. Between the ends of lower slot 112, slot 112 has side walls 118 and 120 which are co-planar with corresponding side walls 122 and 124 of upper slot 110. A pair of partially circular recesses 130 and 132 are formed in side walls 122 and 124, respectively. Recess 130 includes a peripheral wall 134 with an inwardly projecting abutment 136 and a bottom wall 138. Recess 132 includes a peripheral wall 140 with an inwardly projecting rectangular tab 142, an abutment 144 and a bottom wall 146. Preferably, detent grooves 42 and 44 receive the detent rollers 84 and 82 when the knob 17 is located between recesses 130 and 132. Detent grooves 46 and 48 receive the detent rollers 84 and 82 when the knob 17 is spaced apart from recesses 130 and 132 and in a forward position in slot 110.

Referring again to FIG. 1, control lever assembly 10 also preferably includes a set speed adjust knob 150 coupled to a rotary position transducer 152. The angular position of lever 18 about the axis of pivot pin 32 is sensed by a transducer 154 which is coupled to carrier 16 by a sensor arm 156 and a sensor link 158. A set of Hall effect switches 160 are preferably attached to the inner side of the cover plate (not shown) in a position so that they interact with a magnet 162 carried by lever arm 94 when the knob 17 is in the recesses 130 and 132. As a result, the switches 160 can provide signals which represent the rotary orientation of knob 17 and lever 18. As shown in FIG. 8, these various switches and sensors, and the set speed knob transducer 152 are operatively connected to the transmission control unit 11.

When the knob 17 is within slot 110 and outside of recesses 130 and 132, the side walls of slot 110 slidably engage the knob 17 and maintain the knob in a first orientation wherein its longitudinal axis is aligned with the longitudinal axis of slots 110 and 112. The position of the lever 18 in the slot 110 can be utilized as forward and reverse speed positions.

When knob 17 is manually moved into the portion of slot 110 between recesses 130 and 132, before it is rotated it, can be considered to be in a zero speed position. When released, the spring 104 automatically rotates lever 18 counter-clockwise into a second orientation wherein knob 17 engages abutments 136 and 144. This second orientation can be utilized as a park position of the lever 18.

When knob 17 is moved into the portion of slot 110 between recesses 130 and 132, the knob 17 can be manually rotated clockwise against the bias of spring 104 until knob engages a side of tab 142. In this position the lever can be moved manually radially away from pivot pin 32 so that the bottom surface of knob 17 can be raised up above the top outer surface of tab 142. The knob 17 can then be further manually rotated clockwise into a third rotary orientation wherein notch 102 is aligned to receive tab 142, whereupon spring 104 will pull the lever 18 axially towards pivot pin 32 until tab 142 is fully received by notch 102. This third orientation can be utilized as a neutral position of the lever 18.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A control lever assembly for a vehicle transmission, the control lever assembly comprising:

a guide plate having a slot extending therein and defining a pair of spaced apart slot walls, the guide plate also forming a recess located in a central portion of the slot, the recess having recess walls which are joined to the slot walls;

a lever having a shaft and a knob on an end of the shaft, the shaft being rotatable about an axis of the shaft and pivotal about a pivot axis which is transverse to the axis of the shaft, at least a portion of the knob being received by the slot, the knob being engagable with the slot walls to maintain the knob in a first orientation, and the knob being rotatable into a second orientation when the knob is received by the recess, the recess wall being engagable with the knob when the knob is in said second orientation to prevent the knob from being removed from the recess unless the knob is rotated to said first orientation.

2. The control lever assembly of claim 1, wherein:

the recess wall forms an abutment which is engageable with the knob to limit rotation of the knob about the shaft axis.

3. The control lever assembly of claim 1, further comprising:

a spring coupled to the lever and biased to rotate the lever into said second orientation.

4. The control lever assembly of claim 1, further comprising:

a housing supporting the guide plate; and a carrier member pivotally coupled to the housing, the lever having a shaft supported by the carrier and rotatable about an axis of the shaft and relative to the carrier.

5. The control lever assembly of claim 4, further comprising:

a spring coupled between the lever and the carrier and biased to rotate the lever into said second orientation.

6. The control lever assembly of claim 1, further comprising:

a detent member extending substantially parallel to the slot, and having a detent groove formed therein; and a detent roller carried with the lever and engaging the detent member, the roller engaging the detent groove to releasably hold the lever in a desired position with respect to the guide plate.

7. The control lever assembly of claim 1, further comprising:
- a detent member extending substantially parallel to the slot, and having a pair of detent grooves formed adjacent to each other on opposite sides of the detent member; and
- a detent roller unit carried with the lever, the detent roller unit having a pair of detent rollers, each detent roller engaging a corresponding and opposite side of the detent member, the rollers engaging the detent grooves to releasably hold the lever in a desired position with respect to the guide plate; and
- a detent spring coupled to the rollers and biased to urge the rollers towards the detent member.

8. The control lever assembly of claim 1, wherein:
the lever is movable axially; and
the recess wall forms a projection, the lever being movable axially so that the knob can be raised over the projection and rotated into a third orientation.

9. The control lever assembly of claim 8, wherein:
the lever shaft has a radially projecting collar formed thereon; and
the carrier has an abutment which is engagable with the collar to limit axial movement of the lever away from the pivot axis.

10. The control lever assembly of claim 8, further comprising:
a spring coupled to the lever, the spring being biased to rotate the lever into said second orientation and the spring being biased to move the knob towards the pivot axis.

11. The control lever assembly of claim 1, wherein:
the lever is movable axially and the knob has a notch formed in a bottom end thereof; and
the recess wall forms a projection which projects radially therefrom, the lever being movable axially so that the knob can be raised over the projection and rotated into a third orientation wherein the notch receives the projection.

12. The control lever assembly of claim 11, wherein:
the lever shaft has a radially projecting collar formed thereon; and
the carrier has an abutment which is engagable with the collar to limit axial movement of the lever away from the pivot axis.

13. The control lever assembly of claim 11, further comprising:
a spring coupled to the lever, the spring being biased to rotate the lever into said second orientation and the spring being biased to move the lever towards the pivot axis.

14. A control lever assembly, comprising:
a housing;
a guide plate mounted on an end of the housing, the guide plate having a slot extending therein and an upwardly opening recess joined with a central portion of the slot;
a pivot pin spaced apart from the guide plate and projecting from the housing;
a carrier member pivotally mounted on the pin;
a lever having a shaft and a knob on an end of the shaft, the shaft being supported by the carrier and being rotatable about an axis of the shaft and relative to the carrier, the lever being pivotal about the pin to move the knob, a portion of the knob being received by the slot, and the slot having walls which are engagable with said portion of the knob to maintain the knob in a first orientation; and
a spring coupled between the lever and the carrier and biased to rotate the lever in a selected direction about the axis of the shaft, the spring rotating the knob into a second orientation when the knob is received by the recess, a wall of the recess being engagable with the knob when the knob is in said second orientation to prevent pivoting of the lever.

15. A control lever assembly for a vehicle transmission, the control lever assembly comprising:
a guide plate having a longitudinally extending slot and a recess located in a central portion of the slot;
a control lever received by the slot, pivotal about a pivot axis which is perpendicular to a longitudinal dimension of the slot, and rotatable about a rotation axis which is perpendicular to the pivot axis, the lever being slidable in the slot to forward and reverse speed positions and rotatable in the recess to a park position, a wall of the slot engaging the lever to prevent pivoting of the lever when the lever is in said park position.

16. The control lever assembly of claim 15, wherein:
the lever is rotatable in a first direction to the park position, and the lever is rotatable in a second direction to a neutral position.

17. A control lever assembly for a vehicle transmission, the control lever assembly comprising:
a housing;
a control lever having a shaft, the lever being pivotal with respect to the housing about a pivot axis which is perpendicular to an axis of the shaft and among a plurality of pivot positions, the lever being rotatable about the axis of the shaft;
a spring coupled to the lever and biased to rotate the lever in a selected direction about the axis of the shaft from a first rotary orientation to a second rotary orientation; and
a guide member engaging the lever to prevent rotation of the lever unless the lever is in a selected one of said pivot positions, the guide member also engaging the lever to prevent pivoting of the lever when the lever is in said second rotary orientation.

18. The control lever assembly of claim 17, wherein:
the lever is manually rotatable in a direction opposite to said selected direction to a third rotary orientation.

19. The control lever assembly of claim 18, wherein:
the lever is axially movable towards and away from the pivot axis; and
the guide member engages the lever to prevent rotation of the lever to said third rotary orientation unless the lever is moved axially away from the pivot axis.

20. The control lever assembly of claim 19, wherein:
the guide member releasably engages the lever to prevent rotation of the lever out of said third rotary orientation unless the lever is moved axially away from the pivot axis.

* * * * *